United States Patent
Abe

(10) Patent No.: US 6,542,924 B1
(45) Date of Patent: Apr. 1, 2003

(54) DISK ARRAY CLUSTERING SYSTEM WITH A SERVER TRANSITION JUDGMENT SECTION

(75) Inventor: Kenichi Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/332,967

(22) Filed: Jun. 15, 1999

(30) Foreign Application Priority Data

Jun. 19, 1998 (JP) .......................................... 10-173269

(51) Int. Cl.[7] .............................................. G06F 15/16
(52) U.S. Cl. ................... 709/208; 714/4; 710/5
(58) Field of Search .............................. 714/4, 9, 5, 1; 710/5; 711/162; 709/208

(56) References Cited

U.S. PATENT DOCUMENTS

| | | | | |
|---|---|---|---|---|
| 5,696,895 A | * | 12/1997 | Hemphill et al. | 714/4 |
| 5,720,024 A | * | 2/1998 | Saito et al. | 714/1 |
| 5,764,903 A | * | 6/1998 | Yu | 709/208 |
| 5,796,934 A | * | 8/1998 | Bhanot et al. | 714/4 |
| 5,975,738 A | * | 11/1999 | Dekoning et al. | 700/79 |
| 6,009,535 A | * | 12/1999 | Halligan et al. | 714/5 |
| 6,148,414 A | * | 11/2000 | Brown et al. | 714/9 |
| 6,260,125 B1 | * | 7/2001 | McDowell | 711/162 |
| 6,282,584 B1 | * | 8/2001 | Garroussi et al. | 710/5 |
| 6,292,905 B1 | * | 9/2001 | Wallach et al. | 714/4 |

FOREIGN PATENT DOCUMENTS

| | | |
|---|---|---|
| JP | 9-54743 | 2/1997 |
| JP | 9-81438 | 3/1997 |
| JP | 9-265355 | 10/1997 |

* cited by examiner

*Primary Examiner*—Zarni Maung
*Assistant Examiner*—Jungwon Chang
(74) *Attorney, Agent, or Firm*—Foley & Lardner

(57) ABSTRACT

A disk array in a disk array clustering system includes a server transition judgment section which monitors only the SCSI commands sent to the disk array by the agent program in a server and informs, when a command received by only one controller up to then is received also by the other controller, the agent program of the server that has issued the command of unit attention. The agent program when received the unit attention recognizes that it has been started due to the switching of servers, and informs the manager program of the fact. The manager program informs the monitoring client of the change of servers.

3 Claims, 7 Drawing Sheets

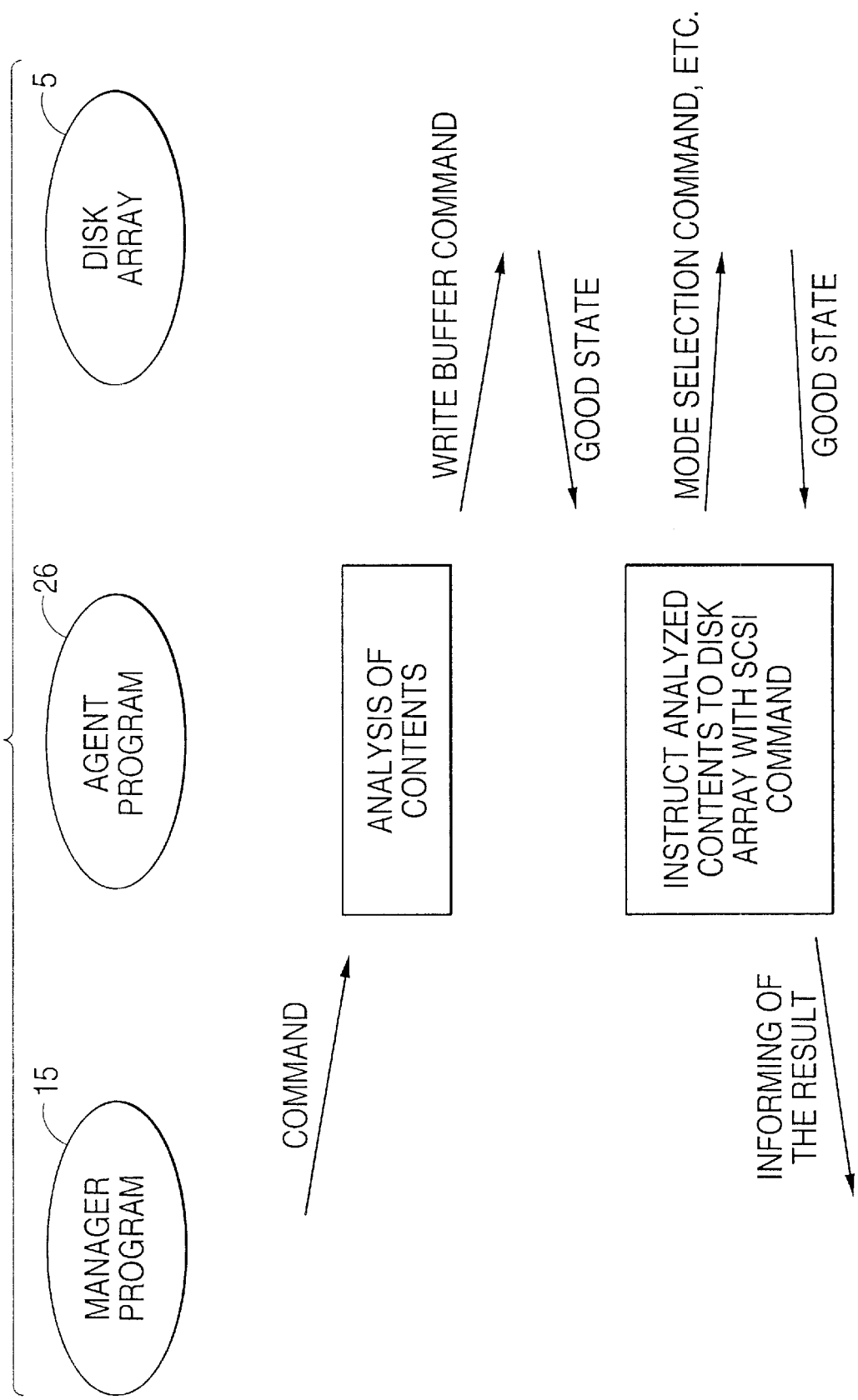

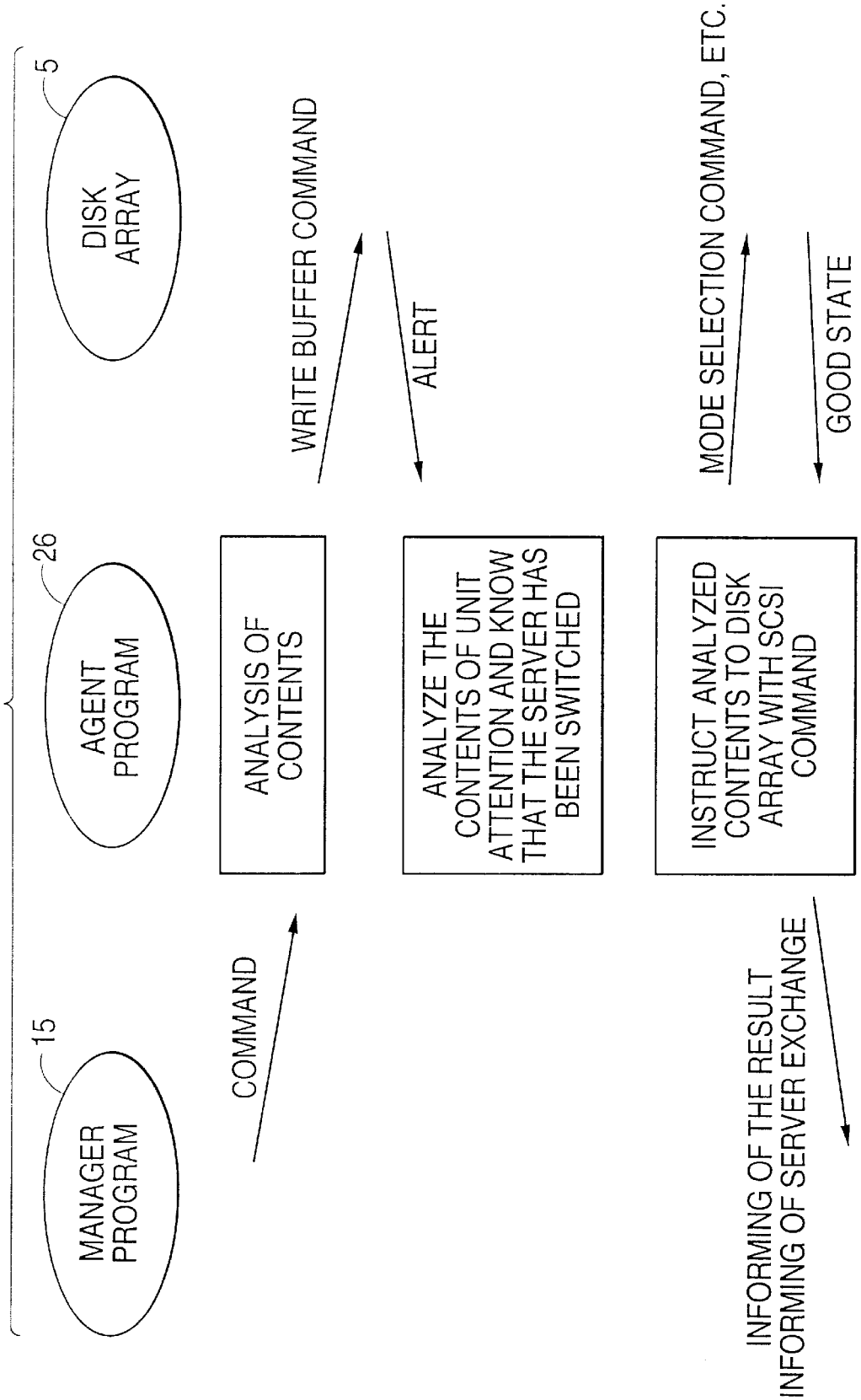

DISK ARRAY CLUSTERING SYSTEM WITH A SERVER TRANSITION JUDGMENT SECTION

BACKGROUND OF THE INVENTION

1. Field of the Invention

The present invention relates to a clustering system for a disk array in which a monitoring client including a manager program and a plurality of user clients are connected with the disk array through a server.

2. Description of the Related Art

A disk array generally has a larger capacity than an HDD (hard disk drive) used for an external memory for a personal computer, etc., and records redundant data in a plurality of the HDDs included in the disk array during operation. By recording such redundant data, recorded data is maintained unchanged even in the event of failures of several HDDs in the disk array. In addition, providing redundancy to the power supply and cooling fans of the apparatus allows parts damaged during operation to be exchanged without interrupting a host computer even if a power supply and a fan are damaged.

Such a disk array is commonly connected with a host computer through a standardized cable via an SCSI (Small Computer System Interface) standardized by ANSI (American National Standards Institute). An SCSI command is transmitted to the disk array from the host computer. The disk array can write therein data from the host computer in accordance with the contents of the SCSI command. The host computer can read data stored in the disk array, and can also read the current states of the HDD and fan.

Control software in the disk array provides the user with functions of displaying on the screen of a computer quality judgment information on whether parts of the disk array are operating normally or they require exchange because of trouble, instructing the user to select several data recording schemes for the disk array, called RAID (Redundant Arrays of Inexpensive Disks), displaying on the screen of the host computer sudden trouble of parts and informing the trouble of addresses of recorded electronic mail.

In recent years, many articles have appeared in which a GUI (Graphical User Interface)is attached to improve operability by permitting a user to view in color the state of the disk array. There are various known operating systems for a disk array. Some examples are Windows 3.x, Windows 95, 98, NT (Microsoft company), Netware (Novel company), HP-UX (Hewlet Packard), and Solaris (Sunmicro System company).

In the prior art, the control software for the disk array operates on the server to which the disk array is connected, and a user enjoys disk array control service at the server. However, enterprise users and the like increasingly actuate a plurality of servers each of which is connected with a disk array, and there are users who operates a server after removing their display from the server. Accordingly, it has become dominant that control of a disk array is centralized, so that a user has no need to go to the disk array, and all services of the disk array can be obtained from one client installed at the user's job site.

To this end, the control software for the disk array, instead of a system wherein a program having all functions is loaded in each server, has adopted a system wherein an agent program is disposed on the client's manager program and each server and the agent program of each server issues instructions to the associated disk array according to instructions received from client's manager program and sends a value received from the disk array to the manager program.

For improving the reliability of a server itself under such conditions, the clustering technique has come into the light spot.

A prior art clustering informing technique will be described. FIG. 1 is a block diagram illustrating a system configuration which is implemented on Windows NT. This system includes two servers 3, 4 to effect clustering control of a disk array 5. A manager program 15, which is a user interface for the disk array 5, is loaded on a monitor client 13, and a master server 3, a slave server 4, client 13, and a general user client 16 are connected with each other through a LAN 12. Manager program 15 displays information on disk array 5 with a GUI for a user, and receives instructions by keyboard and mouse from the user and provides instructions to the disk array 5. An agent program 7 and an OS 9 are loaded on master server 3, and an agent program 8 and an OS 10 are loaded on the slave server 4. Agent programs 7 and 8 are identical, and receive instructions from manager program 15, issue an SCSI command to the disk array 5 connected with servers 4, 5, and send a reply to the instruction to the manager program 15 based on data returned from disk array 5. Master server 3 and slave server 4 are connected with each other through a heart beat 11 for mutual communication for the OSs 9, 10 to realize the clustering. Disk array 5 includes controllers 1, 2 connected with master server 3 and slave server 4, respectively, to receive the SCSI command from master server 3 and slave server 4.

FIG. 2 is a block diagram illustrating the configuration of the clustering system when control is switched to the slave server.

In the configuration of FIG. 2, which is basic, when the server suffers from trouble owing to any cause, many general clients connected with each other through the LAN suffer inconvenience. This clustering technique has been devised to prevent the difficulties of the configuration of FIG. 1, and as illustrated in FIG. 2, the two servers appear to be one highly reliable server when viewed from the client.

First, master server 3 in FIG. 1 is operated as usual. Specifically, master server 3 communicates with the client 16 on the basis of IP (Internet Protocol) addresses and host names, and an application program in the server is operated. The control software of the disk array 5 is also operated on master server 3. Slave server 4 and master server 3 recognize mutual conditions at a certain time interval through a method called heart beat communication, and slave server 4 is prevented from being viewed from client 16.

When master server 3 has trouble at a certain time, slave server 4 detects the failure of master server 3 through the heart beat communication and operates in place of master server 3. That is, slave server 4 can be viewed from the client, and behaves such that it forces client 16 to recognize the IP address and host name of the slave server as being the same as those of the previous master server. Since the same agent program 8 of the disk array control software as that of master server 3 is included in slave server 4, the agent program operates on slave server 4 even when the control is switched to slave server 4. Therefore, manager program 15 at client 13 can communicate continuously and reliably with agent program 8, ensuring system operation without interruption of the service even when the control is switched to slave server 4. When the trouble at master server 3 has been corrected, if slave server 4 detects that master server 3 has returned to normal through heart beat communication, the control is shifted to master server 3, and slave server 4 is put into a standby mode. The control of the transition is guaranteed by both OSs 9, 10.

When master server 3 has a trouble owing to any cause, agent programs 7, 8 can not know by themselves which server is operating between them without a particular cluster API (Application Programming Interface) of the OSs 9, 10. Since actually manager program 15 recognize that the system includes one server 25 with higher reliability as shown in FIG. 2, it can not know when the control is switched to slave server 4 and when the control is returned to master slave 3.

SUMMARY OF THE INVENTION

It is an object of the present invention to provide a disk array clustering system which is capable of notifying the transition of a server.

To achieve the aforementioned object, a disk array clustering system according to the present invention includes a server transition judgment section.

The server transition judgment section monitors for SCSI commands issued only by agent programs in servers among SCSI commands received by the disk array. If a SCSI command that has hitherto been received by either one of the controllers in the disk array, is then received instead by the other controller, the server transition judgment section alerts the agent program in the server corresponding to the other controller. The agent program that has received the alert notifies the manager program that it has been activated through the switching of a server. The manager program notifies the monitor client of the server transition.

Accordingly, an user side can surely acknowledge of the server transition in clustering.

In addition, an application program that recognize the server transition in clustering can be designed without the use of a conventional dedicated cluster API, leading to the improvement of productivity and quality of a software.

The above and other objects, features and advantages of the present invention will become apparent from the following description with reference to the accompanying drawings which illustrate examples of the present invention.

BRIEF DESCRIPTION OF THE DRAWINGS

FIG. 6 is a view illustrating a protocol of a virtual server and a manager when the control is in normal operation; and FIG. 7 is a view illustrating the protocol of the virtual server and the manager when the control is switched to the slave server.

DESCRIPTION OF THE PREFERRED EMBODIMENTS

Figure 1:
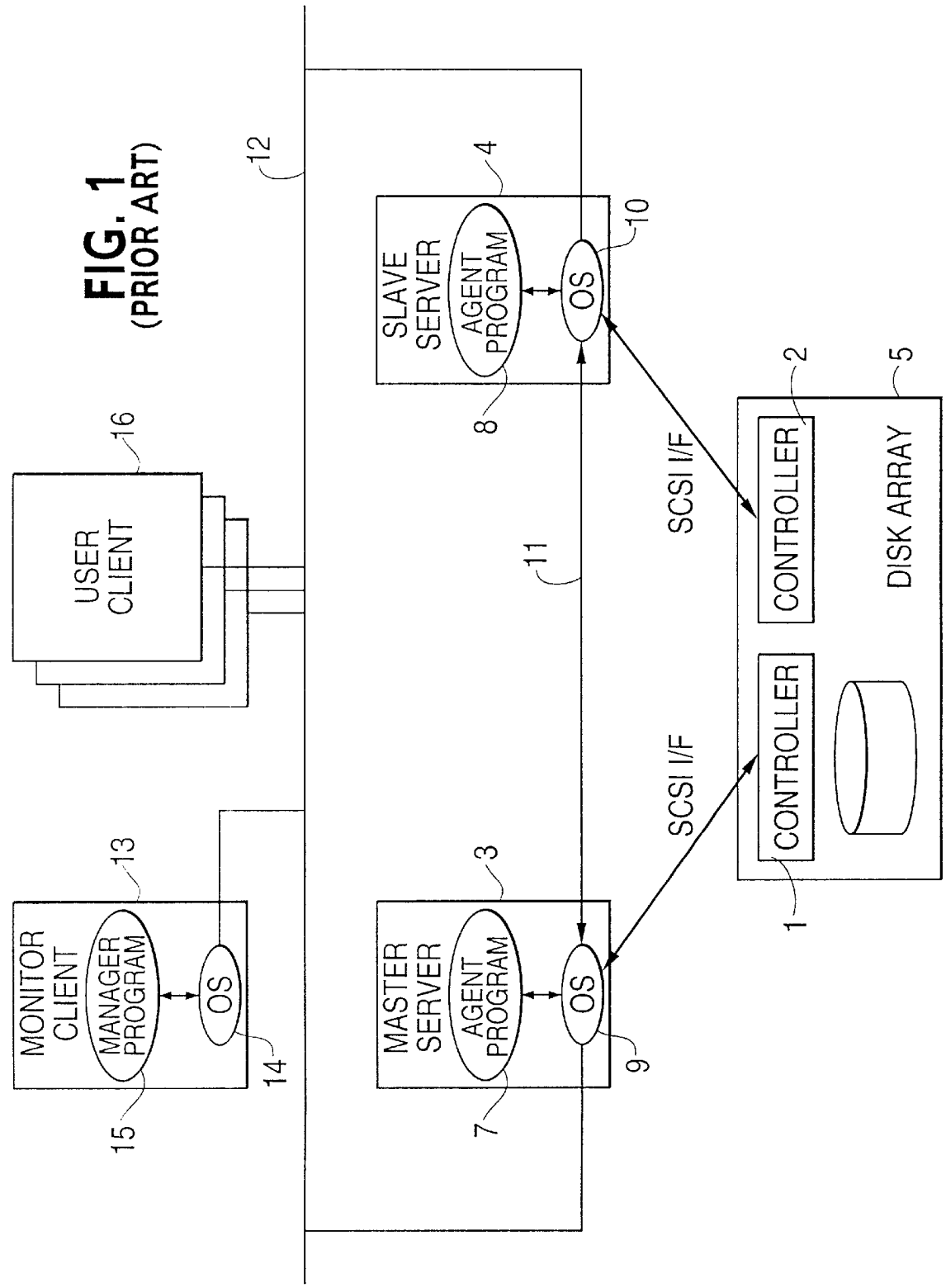
FIG. 1 is a view illustrating the configuration of a prior art disk array clustering system.
Figure 3:
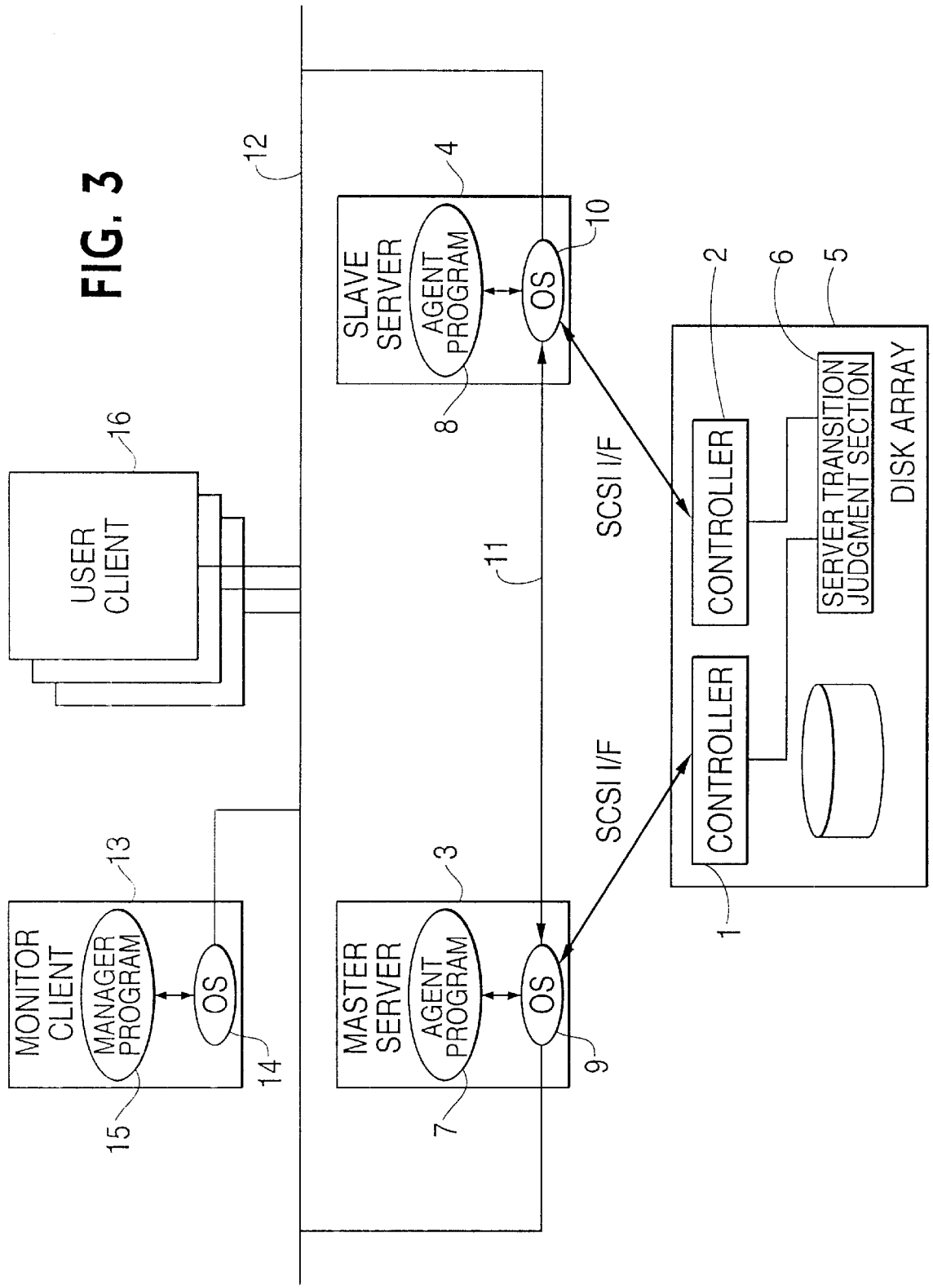
FIG. 3 is a view illustrating the configuration of a disk array clustering system according to an embodiment of the present invention.

Referring to FIG. 3, there is shown a disk array clustering system according to an embodiment of the present invention. Same reference numerals as were used in FIG. 1 are used to designate elements that are common to both systems.

Disk array 5 includes in addition to controllers 1 and 2 connected respectively with master server 3 and slave server 4, server transition judgment section 6 connected with the controllers 1 and 2 to identify SCSI commands received respectively by controller 1 or 2 to determine whether the server transition has occurred.

Clustering in the present embodiment will be described below.

Figure 4:
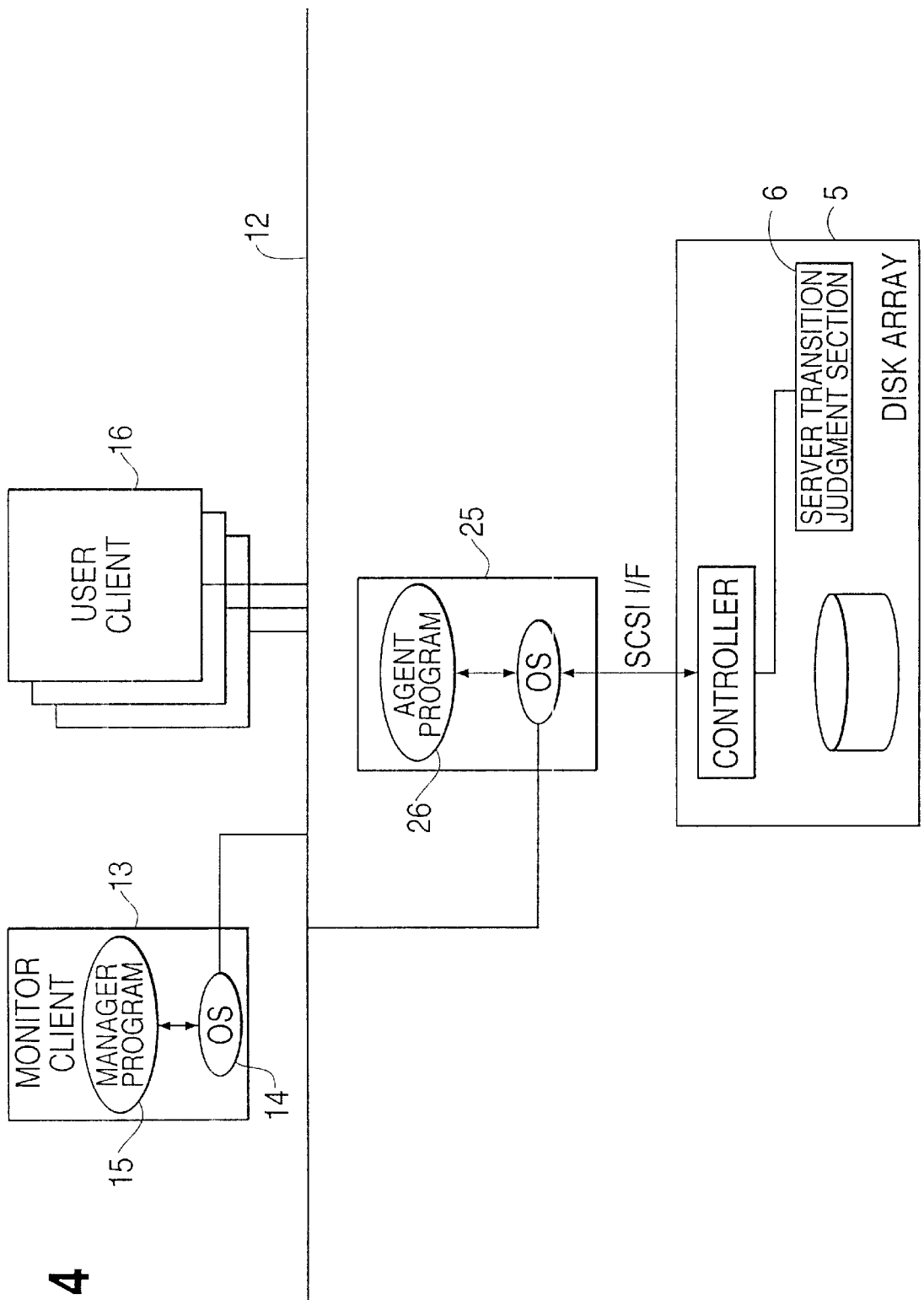
FIG. 4 is a view illustrating the configuration of the disk array clustering system of FIG. 3 when the control is switched to the slave server.

In the embodiment two servers are used for the clustering. FIG. 4 shows the configuration of a clustering system according to the present embodiment where the control is switched to the slave server.

Figure 2:
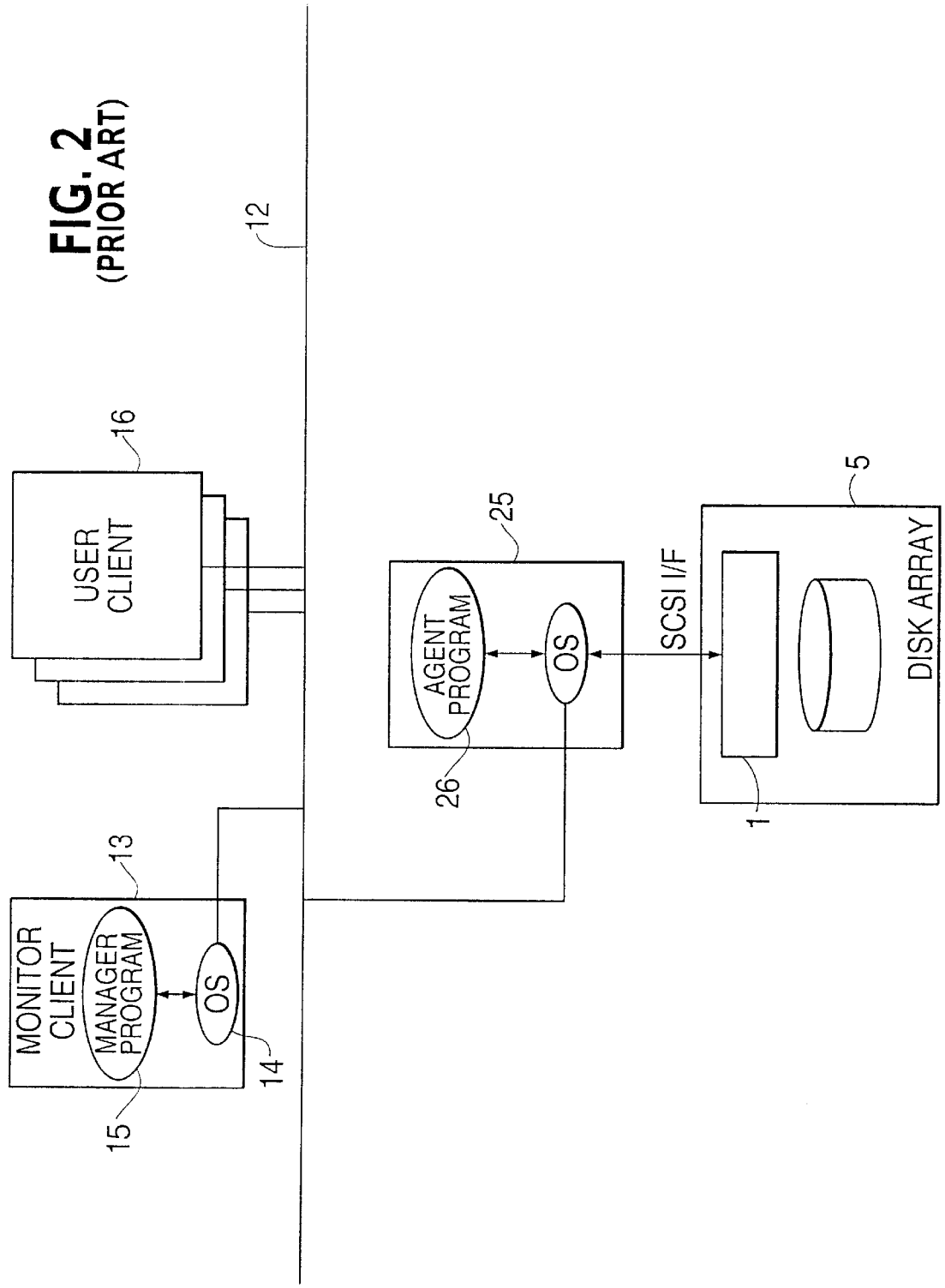
FIG. 2 is a view illustrating the configuration of the prior art disk array clustering system when the control is switched to the slave server.

In the configuration of FIG. 4, which is basic, when a server is troubled owing to any cause, many general clients connected to LAN 4 suffer inconvenience. To prevent this, in a clustering technique the configuration of FIG. 3 is used, and the system is designed such that server 3 and 4 appear to be one highly reliable server as illustrated in FIG. 2, when viewed from the client.

Operation of the embodiment will be described with reference to the drawings.

First, explanation will be presented with respect to server transition recognition by the disk array, and a manner in which the server transition is informed by the agent. In the following, "A" designates master server 3 and "B" designates slave server 4.

At step 31, when the power supply is turned on, server transition judgment section 6 in the disk array 5 defines in " " a direction flag Dir for a write buffer command having an ID of "56", which is a key word and sent from the server presently operating. Server transition judgment section 6 monitors all SCSI commands issued by controllers 1 and 2. When a write buffer command with the ID "56" is received at step 32, and when the reception direction flag Dir received from controller 1 is "B" at steps 33, 34, the sever transition judgment section determines that a change has occurred, and sends an alert to server 3 and sets the flag Dir to "A" at step 37. Further, when the reception direction flag from the controller 2 is "A" at step 35, the server transition judgment section determines that a change has occurred, and sends an alert to server 4 at step 38, and sets the flag Dir to "B" at step 39.

As discussed above, in the clustering system of FIG. 3, servers 3 and 4 behave as a highly reliable server as in FIG. 4 when viewed from the client. Therefore, manager program 15 fails to know whether agent program 26 is which of agent program 7 in master server 3 or agent program 8 in slave server 4.

A procedure for manager program 15 to know which server the agent program 26 of FIG. 4 is, will be described below.

FIG. 6 illustrates a protocol between virtual server 25 and manager program 15.

Agent program 26 in virtual server 25 receives a command from manager program 15, and analyzes the contents to execute the instruction of the command. Depending upon the contents, the agent program acts on disk array 5 based on SCSI command and returned the result of the command received previously to manager program 15. At this time, the write buffer command with ID "56" is surely issued as the first SCSI command.

Let it be assumed that control is changed from master server 3 to slave server 4, or vice versa. FIG. 7 illustrates a protocol between the virtual server and the manager program when the control is switched to the slave server.

Figure 5:
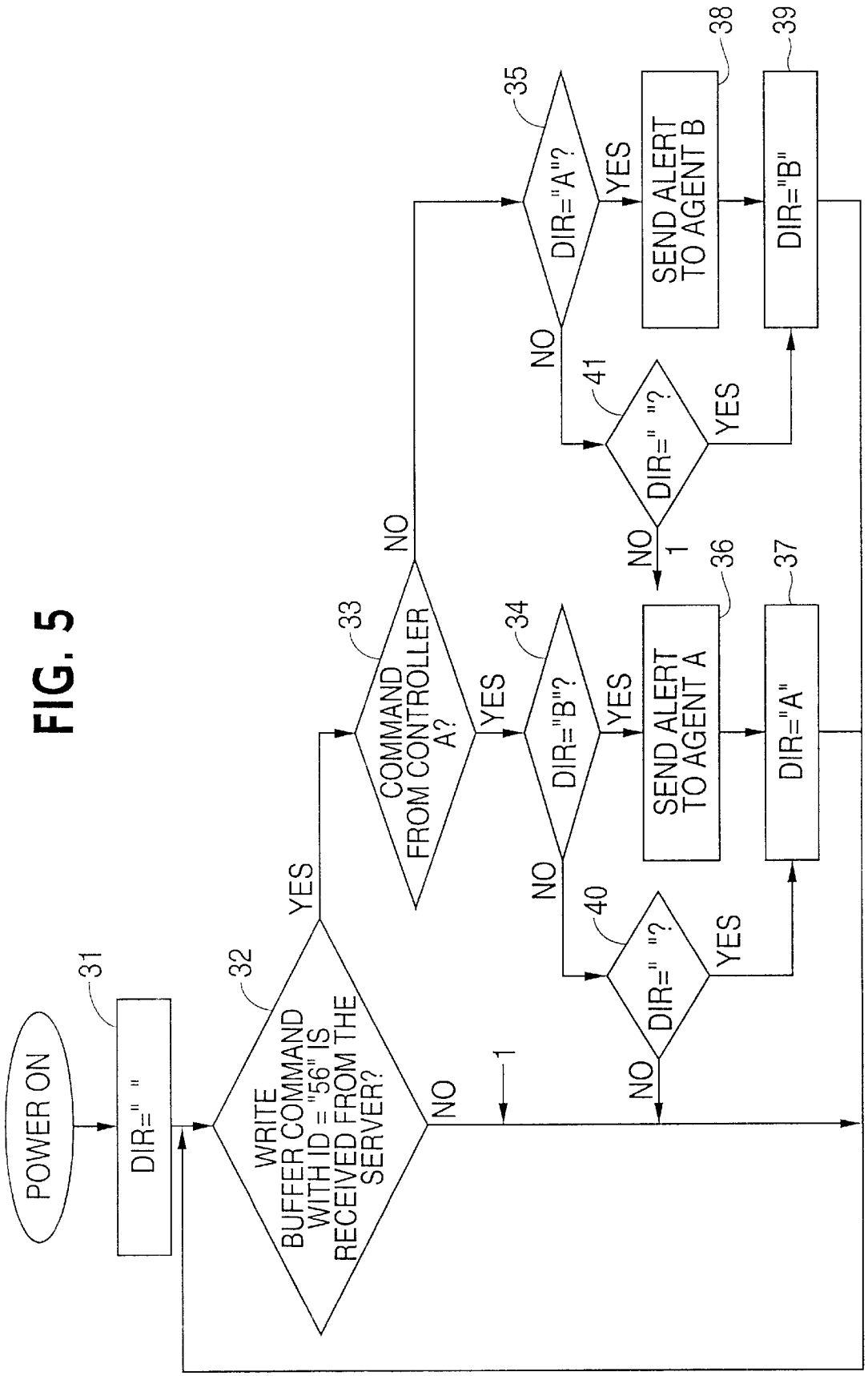
FIG. 5 is a flow chart illustrating a server transition recognition procedure of the disk array and communication procedure of an agent.

As illustrated in FIG. 7, manager program 15 issues a command to agent program 26. The server transition judgment section 6 issues a SCSI command to the disk array based on the contents of the command. If the control of the server has already been changed, an alert is returned from the disk array following the procedure shown in FIG. 5, whereby agent program 26 can inform the manager program 15 of the change of servers.

While a preferred embodiment of the present invention has been described using specific terms, such description is for illustrative purposes only, and it is to be understood that changes and variations may be made without departing from the spirit or scope of the following claims.

What is claimed is:

1. A disk array clustering system comprising:

a disk array;

a master server and a slave server both for transmitting SCSI commands to respective associated controllers of said disk array;

a monitoring client and a plurality of user clients connected with said disk array through said master server and said slave server, said monitoring client having a manager program as a control software for controlling said disk array, said master server and said slave server having respective identical agent programs for receiving instructions from said manager program, issuing instructions to said disk array based upon instructions received from the manager program, and transmitting information received from said disk array to said manager program;

said disk array further including a server transition judgment section for monitoring SCSI commands received by each controller, and when a SCSI command is received by a controller which until then has been received by another controller, sending an alert to the agent program in a server which has newly sent the SCSI command;

each of said respective agent programs further including means, when receiving said alert, for recognizing that said respective agent program has been activated by the switching of the servers, and informing said manager program of this fact; and said manager program further including means for informing said monitoring client of the switching of servers.

2. A system according to claim 1 wherein said master server and said slave server communicate with each other through a heart beat.

3. A system according to claim 1 wherein said agent program further including means for sending different SCSI commands to the controller in said disk array.

* * * * *